US010050330B2

(12) United States Patent
McAllister

(10) Patent No.: US 10,050,330 B2
(45) Date of Patent: Aug. 14, 2018

(54) AERIAL INVENTORY ANTENNA

(71) Applicant: Clarke William McAllister, Eugene, OR (US)

(72) Inventor: Clarke William McAllister, Eugene, OR (US)

(73) Assignee: ADASA Inc., Eugene, OR (US)

( * ) Notice: Subject to any disclaimer, the term of this patent is extended or adjusted under 35 U.S.C. 154(b) by 0 days.

(21) Appl. No.: 15/691,739

(22) Filed: Aug. 30, 2017

(65) Prior Publication Data
US 2018/0006356 A1 Jan. 4, 2018

Related U.S. Application Data

(63) Continuation-in-part of application No. 15/286,560, filed on Oct. 6, 2016, now Pat. No. 9,780,435, and a continuation-in-part of application No. 14/311,215, filed on Jun. 20, 2014, and a continuation-in-part of application No. 13/693,026, filed on Dec. 3, 2012, now Pat. No. 9,747,480.

(60) Provisional application No. 62/238,105, filed on Oct. 6, 2015, provisional application No. 61/989,823, filed on May 7, 2014, provisional application No. 61/879,054, filed on Sep. 17, 2013, provisional application No. 61/838,186, filed on Jun. 21, 2013, provisional application No. 61/709,771, filed on Oct. 4, 2012, provisional application No. 61/708,207, filed on Oct. 1, 2012, provisional application No. 61/677,470, filed on Jul. 30, 2012, provisional application No. 61/567,117, filed on Dec. 5, 2011.

(51) Int. Cl.
*H01Q 1/22* (2006.01)
*G06K 7/10* (2006.01)
*H01Q 1/28* (2006.01)
*H01Q 7/00* (2006.01)
*H01Q 1/36* (2006.01)

(52) U.S. Cl.
CPC ....... *H01Q 1/2216* (2013.01); *G06K 7/10316* (2013.01); *H01Q 1/28* (2013.01); *H01Q 1/362* (2013.01); *H01Q 7/00* (2013.01)

(58) Field of Classification Search
CPC .......... H01Q 1/22; H01Q 1/2216; H01Q 1/28; H01Q 1/362; H01Q 7/00; G06K 7/10316
USPC ............................................. 701/3; 340/10.1
See application file for complete search history.

(56) References Cited

U.S. PATENT DOCUMENTS 300,827 A 6/1884 Adams
552,271 A 12/1895 Bolton
(Continued)

FOREIGN PATENT DOCUMENTS

EP 1913235 7/2006
EP 1770591 A2 4/2007
(Continued)

OTHER PUBLICATIONS

Claire Swedberg, Robotic RFID Reader Automates Inventory Tracking, RFID Journal, Nov. 28, 2012.
(Continued)

*Primary Examiner* — Albert Wong

(57) ABSTRACT

The present invention relates to a dual polarization radio frequency identification antennae for automatically reading and locating inventory when moved and rotated by an inventory-scanning UAV or robot having three dimensions of position mobility.

7 Claims, 6 Drawing Sheets

(56) References Cited

U.S. PATENT DOCUMENTS

| | | | |
|---|---|---|---|
| 572,036 A | 11/1896 | Theryc |
| 2,190,717 A | 2/1940 | Kukop |
| 2,573,401 A | 10/1951 | Carter |
| 2,993,204 A | 7/1961 | Macalpine |
| 3,101,472 A | 8/1963 | Goubau |
| 3,336,530 A | 8/1967 | Sloan |
| 3,500,427 A | 3/1970 | Landesman |
| 3,699,585 A | 10/1972 | Morrison |
| 3,755,815 A | 8/1973 | Stangel |
| 3,766,558 A | 10/1973 | Kuechken |
| 3,836,979 A | 9/1974 | Kurland |
| 3,864,689 A | 2/1975 | Young |
| 4,023,167 A | 5/1977 | Wahlstrom |
| 4,129,866 A | 12/1978 | Turco |
| 4,163,233 A | 7/1979 | Becker |
| 4,203,105 A | 5/1980 | Dragone |
| 4,223,830 A | 9/1980 | Walton |
| 4,250,508 A | 2/1981 | Dragone |
| 4,278,977 A | 7/1981 | Nossen |
| 4,442,438 A | 4/1984 | Siwiak |
| 4,471,345 A | 9/1984 | Barrett |
| 4,476,469 A | 10/1984 | Lander |
| 4,598,275 A | 7/1986 | Ross |
| 4,636,950 A | 1/1987 | Caswell |
| 4,673,932 A | 6/1987 | Eckchian |
| 4,779,097 A | 10/1988 | Morchin |
| 4,809,178 A | 2/1989 | Ninomiya |
| 4,918,425 A | 4/1990 | Greenburg |
| 4,935,747 A | 6/1990 | Yuichi |
| 5,019,815 A | 5/1991 | Lemelson |
| 5,036,308 A | 7/1991 | Fockens |
| 5,146,235 A | 9/1992 | Frese |
| 5,155,684 A | 10/1992 | Burke |
| 5,165,064 A | 11/1992 | Mattaboni |
| 5,214,410 A | 5/1993 | Verster |
| 5,266,925 A | 11/1993 | Vercellotti |
| 5,280,159 A | 1/1994 | Schultz |
| 5,347,286 A | 9/1994 | Babitch |
| 5,381,137 A | 1/1995 | Ghaem |
| 5,382,784 A | 1/1995 | Eberhardt |
| 5,500,650 A | 3/1996 | Snodgrass |
| 5,530,330 A | 6/1996 | Baiden |
| 5,583,850 A | 12/1996 | Snodgrass |
| 5,621,199 A | 4/1997 | Calari |
| 5,627,544 A | 5/1997 | Snodgrass |
| 5,689,238 A | 11/1997 | Cannon |
| 5,708,423 A | 1/1998 | Ghaffafi |
| 5,734,353 A | 3/1998 | Voorhies |
| 5,763,867 A | 6/1998 | Main |
| 5,785,181 A | 7/1998 | Quartararo |
| 5,798,693 A | 8/1998 | Engellenner |
| 5,825,045 A | 10/1998 | Koenck |
| 5,825,298 A | 10/1998 | Walter |
| 5,850,187 A | 12/1998 | Carrender |
| 5,962,837 A | 10/1999 | Main |
| 5,974,078 A | 10/1999 | Tuttle |
| 5,986,570 A | 11/1999 | Black |
| 5,990,847 A | 11/1999 | Filipovic |
| 5,995,017 A | 11/1999 | Marsh |
| 6,002,344 A | 12/1999 | Bandy |
| 6,076,025 A | 6/2000 | Ueno |
| 6,078,251 A | 6/2000 | Landt |
| 6,122,329 A | 9/2000 | Zai |
| 6,130,613 A | 10/2000 | Eberhardt |
| 6,184,841 B1 | 2/2001 | Shober |
| 6,195,006 B1 | 2/2001 | Bowers |
| 6,195,053 B1 | 2/2001 | Kodukula |
| 6,354,493 B1 | 3/2002 | Mon |
| 6,397,063 B1 | 5/2002 | Sessions |
| 6,414,626 B1 | 7/2002 | Greef |
| 6,415,978 B1 | 7/2002 | McAllister |
| 6,459,726 B1 | 10/2002 | Ovard |
| 6,486,780 B1 | 11/2002 | Garber |
| 6,653,987 B1 | 11/2003 | Lamensdorf |
| 6,677,852 B1 | 1/2004 | Landt |
| 6,724,308 B2 | 4/2004 | Nicholson |
| 6,809,490 B2 | 10/2004 | Jones |
| 6,830,181 B1 | 12/2004 | Bennett |
| 7,023,341 B2 | 4/2006 | Stilp |
| 7,056,185 B1 | 6/2006 | Anagnostou |
| 7,057,492 B2 | 6/2006 | Jackson |
| 7,068,210 B1 | 6/2006 | Atindra |
| 7,075,435 B2 | 7/2006 | Jesser |
| 7,118,036 B1 | 10/2006 | Couch |
| 7,119,738 B2 | 10/2006 | Bridgelall |
| 7,223,030 B2 | 5/2007 | Fessler |
| 7,236,091 B2 | 6/2007 | Kiang |
| 7,245,215 B2 | 7/2007 | Gollu |
| 7,250,845 B2 | 7/2007 | Mick |
| 7,265,674 B2 | 9/2007 | Tuttle |
| 7,319,397 B2 | 1/2008 | Chung |
| 7,321,305 B2 | 1/2008 | Gollu |
| 7,400,989 B2 | 7/2008 | Chapman |
| 7,427,955 B2 * | 9/2008 | Choi ............... H01Q 1/22 343/700 MS |
| 7,446,662 B1 | 11/2008 | Somogyi |
| 7,455,217 B2 | 11/2008 | Taylor |
| 7,538,946 B2 | 5/2009 | Smith |
| 7,548,166 B2 | 6/2009 | Roeder |
| 7,603,291 B2 | 10/2009 | Raiyani |
| 7,669,763 B2 | 3/2010 | Ernesti |
| 7,693,757 B2 | 4/2010 | Zimmerman |
| 7,733,230 B2 | 6/2010 | Bomber |
| 7,747,477 B1 | 6/2010 | Louis |
| RE41,531 E | 8/2010 | Wood |
| RE41,562 E | 8/2010 | Dando |
| 7,821,391 B2 | 10/2010 | Gupta |
| 7,822,424 B2 | 10/2010 | Markhovsky |
| 7,830,262 B1 | 11/2010 | Diorio |
| 7,876,224 B2 | 1/2011 | Prokopuk |
| 7,877,166 B2 | 1/2011 | Harwig |
| 7,916,028 B2 | 3/2011 | Oberle |
| 7,932,827 B2 | 4/2011 | Chand |
| 8,022,812 B2 | 9/2011 | Beniyama |
| 8,031,070 B2 | 10/2011 | Fabre |
| 8,072,311 B2 | 12/2011 | Sadr |
| 8,077,041 B2 | 12/2011 | Stern |
| 8,083,013 B2 | 12/2011 | Bewley |
| 8,085,150 B2 | 12/2011 | Oberle |
| 8,106,746 B2 | 1/2012 | Maltseff |
| 8,174,369 B2 | 5/2012 | Jones |
| 8,237,563 B2 | 8/2012 | Schatz |
| 8,289,129 B2 | 10/2012 | Bauchot |
| 8,294,554 B2 | 10/2012 | Shoarinejad |
| 8,412,450 B1 | 4/2013 | Huebner |
| 8,423,548 B1 | 4/2013 | Trandal |
| 8,430,192 B2 | 4/2013 | Gillett |
| 8,532,846 B2 | 9/2013 | Tollenaere |
| 8,542,114 B2 | 9/2013 | Stolarczyk |
| 8,556,173 B1 | 10/2013 | Huebner |
| 8,618,928 B2 | 12/2013 | Weed |
| 8,754,752 B2 | 6/2014 | Shoarinejad |
| 8,761,603 B1 | 6/2014 | Maleki |
| 9,061,102 B2 | 6/2015 | Levien |
| 9,067,671 B2 | 6/2015 | Stark |
| 2002/0005774 A1 | 1/2002 | Rudolph |
| 2002/0070862 A1 | 6/2002 | Francis |
| 2002/0165790 A1 | 11/2002 | Bancroft |
| 2003/0137268 A1 | 7/2003 | Papanikolopoulos |
| 2004/0074964 A1 | 4/2004 | Falkenrich-Wesche |
| 2005/0149226 A1 | 7/2005 | Stevens |
| 2005/0200457 A1 | 9/2005 | Bridgelall |
| 2005/0246248 A1 | 11/2005 | Vesuna |
| 2006/0068711 A1 | 3/2006 | Chiu |
| 2006/0114104 A1 | 6/2006 | Scaramozzino |
| 2007/0061041 A1 | 3/2007 | Zweig |
| 2007/0073513 A1 | 3/2007 | Posamentier |
| 2007/0131754 A1 | 6/2007 | Brandon |
| 2007/0176780 A1 | 8/2007 | Hart |
| 2007/0222665 A1 | 9/2007 | Koeneman |
| 2007/0252696 A1 | 11/2007 | Belisle |
| 2007/0282482 A1 | 12/2007 | Beucher |
| 2008/0042847 A1 | 2/2008 | Hollister |
| 2008/0068173 A1 | 3/2008 | Alexis |

(56) References Cited

U.S. PATENT DOCUMENTS

| | | |
|---|---|---|
| 2008/0077511 A1 | 3/2008 | Zimmerman |
| 2008/0106377 A1 | 5/2008 | Flores |
| 2008/0157967 A1 | 7/2008 | Jones |
| 2008/0191873 A1 | 8/2008 | Minerley |
| 2008/0191881 A1 | 8/2008 | Minerley |
| 2008/0224871 A1 | 9/2008 | Bolotin |
| 2008/0231457 A1 | 9/2008 | Mattice |
| 2008/0266092 A1 | 10/2008 | Campero |
| 2009/0012667 A1 | 1/2009 | Matsumoto |
| 2009/0016308 A1 | 1/2009 | Twitchell |
| 2009/0021351 A1 | 1/2009 | Beniyama |
| 2009/0146792 A1 | 6/2009 | Sadr |
| 2009/0231138 A1 | 9/2009 | Lai |
| 2009/0243924 A1 | 10/2009 | Twitchell |
| 2010/0049368 A1 | 2/2010 | Chen |
| 2010/0100269 A1 | 4/2010 | Ekhaguere |
| 2010/0109844 A1 | 5/2010 | Carrick |
| 2010/0131121 A1 | 5/2010 | Gerlock |
| 2010/0309017 A1 | 12/2010 | Ramchandran |
| 2010/0310019 A1 | 12/2010 | Sadr |
| 2011/0090059 A1 | 4/2011 | Sadr |
| 2011/0254664 A1 | 10/2011 | Sadr |
| 2011/0315765 A1 | 12/2011 | Schantz |
| 2012/0083945 A1 | 4/2012 | Oakley |
| 2012/0112904 A1 | 5/2012 | Nagy |
| 2012/0136630 A1 | 5/2012 | Murphy |
| 2012/0139704 A1 | 6/2012 | Sadr |
| 2012/0188058 A1 | 7/2012 | Lee |
| 2012/0197439 A1 | 8/2012 | Wang |
| 2012/0212331 A1 | 8/2012 | Jones |
| 2012/0271461 A1 | 10/2012 | Spata |
| 2012/0273284 A1 | 11/2012 | Nesnas |
| 2012/0274525 A1 | 11/2012 | Lam |
| 2012/0275546 A1 | 11/2012 | Divsalar |
| 2012/0293373 A1 | 11/2012 | You |
| 2013/0024219 A1 | 1/2013 | Martinez |
| 2013/0218721 A1 | 8/2013 | Borhan |
| 2013/0233964 A1 | 9/2013 | Woodworth |
| 2014/0032034 A1 | 1/2014 | Raptopoulos |
| 2014/0061377 A1 | 3/2014 | Smith |
| 2014/0197280 A1 | 7/2014 | Smith |
| 2014/0247116 A1 | 9/2014 | Davidson |
| 2014/0277854 A1* | 9/2014 | Jones .................. G05D 1/102 701/3 |
| 2016/0316255 A1* | 10/2016 | Tseng ................. H04L 65/403 |
| 2016/0365737 A1* | 12/2016 | Vladan .................. H02J 5/005 |
| 2016/0371631 A1* | 12/2016 | Jetcheva ............. G06Q 10/087 |
| 2017/0174343 A1* | 6/2017 | Erickson ............. B64C 39/024 |
| 2017/0178072 A1* | 6/2017 | Poornachandran G06Q 10/0833 |

FOREIGN PATENT DOCUMENTS

| | | |
|---|---|---|
| EP | 1941411 A2 | 7/2008 |
| EP | 2017768 A1 | 1/2009 |
| EP | 2205333 | 7/2010 |
| EP | 2484892 A2 | 8/2012 |
| WO | WO2005076929 | 8/2005 |
| WO | WO2006039119 | 4/2006 |
| WO | WO2006076283 | 7/2006 |
| WO | WO2007047510 | 4/2007 |
| WO | WO2007094868 | 8/2007 |
| WO | WO2008097509 | 8/2008 |
| WO | WO2008118875 | 10/2008 |
| WO | WO2009157653 A3 | 12/2009 |
| WO | WO2011088182 | 7/2011 |
| WO | WO2011135328 | 11/2011 |
| WO | WO2011135329 | 11/2011 |
| WO | WO2013071150 | 5/2013 |

OTHER PUBLICATIONS

Anderson, Ross, The Quadix, Apr. 19, 2004 1-4; https://www.yumpu.com/en/document/view/35443620/amateur-radio-antenna-projects-2004/1744.

Completech, ComAnt CAX+ Cross-Polarized YAGI; https://www.completech.fi/assets/CAX+.pdf.

* cited by examiner

AERIAL INVENTORY ANTENNA

RELATED APPLICATIONS

The present application is a continuation-in-part application of co-pending U.S. patent application Ser. No. 15/286,560 filed 6 Oct. 2016 and of co-pending U.S. patent application Ser. No. 14/311,215 filed 20 Jun. 2014 that claim priority and benefit based on co-pending U.S. patent application Ser. No. 13/693,026 filed on 3 Dec. 2012 by the same inventor Clarke W. McAllister. The present application also claims priority and benefit under 35 USC Section 119(e) of U.S. Provisional Application No. 62/238,105 filed on 6 Oct. 2015 all by the same inventor Clarke W. McAllister, the disclosures of which are expressly incorporated herein by reference. Also the following filed 7 May 2014, and 61/567,117 filed 5 Dec. 2011, and 61/677,470 filed 30 Jul. 2012, and 61/708,207 filed 1 Oct. 2012, and of 61/709,771 filed 4 Oct. 2012, all by the same inventor Clarke W. McAllister.

BACKGROUND

The present invention relates to an automated inventory scanning system, including methods and devices utilizing novel aerial scanning antennae, robots, unmanned aerial vehicles, and RFID (radio-frequency identification) transponders.

Robots are disclosed for aerial scanning using either propellers to lift an unmanned aerial vehicle (UAV), or a scissor lift mounted to a two-wheeled robot for maneuvering an RFID antenna to vertical storage spaces that are located well above floor level.

Radio-frequency identification (RFID) transponders enable improved identification and tracking of objects by encoding data electronically in a compact tag or label. Radio-frequency identification (RFID) transponders, typically thin transceivers that include an integrated circuit chip having radio frequency circuits, control logic, memory and an antenna structure mounted on a supporting substrate, enable vast amounts of information to be encoded and stored and have unique identification.

RFID transponders rank into two primary categories: active (or battery assist) RFID transponders and passive RFID transponders. Active RFID transponders include an integrated power source capable of self-generating signals, which may be used by other, remote reading devices to interpret the data associated with the transponder. Active transponders include batteries and, historically, are considered considerably more expensive than passive RFID transponders. Passive RFID transponders backscatter incident RF energy to remote devices such as interrogators.

Reflections from shelving and other metal objects in the field of an RFID reader are can blind and possibly saturate baseband amplifiers preventing tag reading. Circularly polarized antennae have nulls that result in little or no ability to read linearly polarized RFID transponders at certain distance intervals from the antenna. Aerial RFID scanning also introduces significant ground-bounce problems that also result in poor RFID transponder interrogation performance. These and other problems are overcome by the presently disclosed invention. No prior art comprehensively teaches systems, methods or devices for moving among, overcoming carrier reflections, nulls, and ground bounce to automatically determine the location of RFID-tagged inventory.

SUMMARY OF THE INVENTION

In the present invention seven important problems are solved to make RFID inventory counting and localization a commercial reality for retail stores engaging in omnichannel retailing, including and especially for retailers that want to use their retail sales for as a forward warehouse for fulfillment of consumer's online orders for same day delivery or in-store pickup. In these highly competitive retail environments such as this, inventory errors can result in disastrous customer relationship problems when a retailer promises delivery or pickup of an item that is not actually in stock, ready to hand over to a waiting customer. Therefore it is in this context that the following eight solution criteria make sense from a retail business perspective: push-button inventory, safety, high availability, quiet operation, minimal disturbance to sales floor, centimeter location accuracy, and low capital expense.

Several prior art solutions, including those taught by the present inventor have not offered solutions that perform as well against these eight criteria as well as the present invention.

Push-button inventory solutions are achieved when RFID tags are read automatically. This usually means that some sort of RFID tag scanning is used. RF beams are either fixed or moving. Moving beams are either mechanically or electronically steered to various locations and vector angles. The present invention uses an electro-mechanical beam positioning system to steer RF interrogation beam(s), preferably to illuminate and interrogate each RFID tag without incurring direct labor to do so. Robotic solutions are used and optimal robotic mobility is used through aerial RFID scanning.

Safe movement of a robot requires separation of people and object from fast-moving parts of the robot, including the robot itself. In the present invention the requirements for overcoming the force of gravity to lift an move the mass required to form a beam, transmit RF energy, and collect RFID tag data is best achieved by employing lift from a scissor lift apparatus. In the present invention a modified Quadix antenna provides beam focusing from a high gain antenna that weighs only about 3-5 ounces.

High availability is realized by the present invention by a two-wheeled robot that rolls through tagged inventory items and elevates a rotating scanning antenna to various altitudes of interest.

In retail sales environments a two-wheeled robot operates very quietly, having no loud moving parts.

Propeller wash is a blast of air that interferes with the shopping process by distracting shoppers and displacing retail inventory and displays. The present invention achieves this important design requirement by eliminating propellers. In the present invention the RFID scanning antenna is lifted to various altitudes by an expanding mechanical apparatus.

Centimeter accuracy enables high-resolution item localization accuracy.

Low capital expense relative to large arrays of fixed RFID readers is obvious, such solutions do not scale nearly as well as the present invention. That is because a single robot can read RFID tags over a much greater area than even the best long-range RFID readers. RF beam-steered RFID readers also have a high cost of the equipment and the wiring that is required to power them.

The present invention discloses devices for automatically reading and locating RFID-tagged assets including retail goods, automobiles, and commercial transport trailers.

Herein the term 'robot' is used interchangeably throughout this specification and the associated claims to mean either a rolling robot or a flying robot, such as a UAV, except where a specific meaning is explicitly stated.

Robots of the present invention are optimized and disclosed and claimed for reading RFID tags in retail store environments where metal display racks and shelves reduce the read rate and inventory accuracy of systems that fail to avoid blinding reflections from typical indoor propagation environments. The present invention overcomes limitations of prior art by avoiding unwanted carrier signal reflection paths by using novel scanning devices, features, and methods.

DRAWINGS

DESCRIPTION OF THE INVENTION

Figure 1:
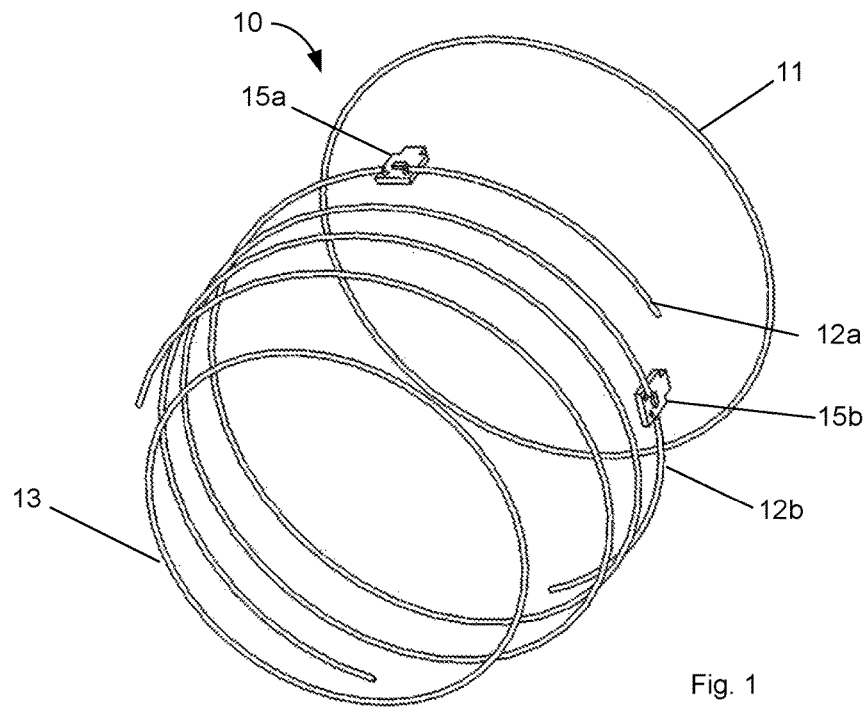
FIG. 1 is a directional dual-elliptical UHF RFID antenna according to one embodiment of the present invention.

Making reference to various figures of the drawings, possible embodiments of the present invention are described and those skilled in the art will understand that alternative configurations and combinations of components may be substituted without subtracting from the invention. Also, in some figures certain components are omitted to more clearly illustrate the invention, similar features share common reference numbers.

To clarify certain aspects of the present invention, certain embodiments are described in a possible environment—as identification means for retail items that are bought and used by consumers. In these instances, certain methods make reference to items such as clothing, garments, shoes, consumables, electronics, and tires, but other items may be used by these methods. Certain embodiments of the present invention are directed for identifying objects using RFID transponders in supply chains, retail stores, warehouses, and distribution centers—both indoors and outdoors.

Some terms are used interchangeably as a convenience and, accordingly, are not intended as a limitation. For example, transponder is a term for wireless sensors that is often used interchangeably with the term tags and the term inlay, which is used interchangeably with inlet. This document generally uses the term or RF tag to refer to passive inlay transponders, which do not include a battery, but include an antenna structure coupled to an RFID chip to form an inlay which is generally thin and flat and substantially co-planar and may be constructed on top of a layer of foam standoff, a dielectric material, or a folded substrate. One common type of passive inlay transponder further includes a pressure-sensitive adhesive backing positioned opposite an inlay carrier layer. Chipless RFID transponders are manufactured using polymers instead of silicon for cost reduction. Graphene tags offer similar benefits. Inlays are frequently embedded in hang tags, pocket flashers, product packaging, and smart labels. A third type: a battery-assist tag is a hybrid RFID transponder that uses a battery to power the RFID chip and a backscatter return link to the interrogator.

The systems, methods, and devices of the present invention utilize an RFID transponder or wireless sensors as a component. Certain RFID transponders and wireless sensors operate at Low Frequencies (LF), High Frequencies (HF), Ultra High Frequencies (UHF), and microwave frequencies. HF is the band of the electromagnetic spectrum that is centered around 13.56 MHz. UHF for RFID applications spans globally from about 860 MHz to 960 MHz. Transponders and tags responsive to these frequency bands generally have some form of antenna. For LF or HF there is typically an inductive loop. For UHF there is often an inductive element and one or more dipoles or a microstrip patch or other microstrip elements in their antenna structure. Such RFID transponders and wireless sensors utilize any range of possible modulation schemes including: amplitude modulation, amplitude shift keying (ASK), double-sideband ASK, phase-shift keying, phase-reversal ASK, frequency-shift keying (FSK), phase jitter modulation, time-division multiplexing (TDM), or Ultra Wide Band (UWB) method of transmitting radio pulses across a very wide spectrum of frequencies spanning several gigahertz of bandwidth. Modulation techniques may also include the use of Orthogonal Frequency Division Multiplexing (OFDM) to derive superior data encoding and data recovery from low power radio signals. OFDM and UWB provide a robust radio link in RF noisy or multi-path environments and improved performance through and around RF absorbing or reflecting materials compared to narrowband, spread spectrum, or frequency-hopping radio systems. Wireless sensors are reused according to certain methods disclosed herein. UWB wireless sensors may be combined with narrowband, spread spectrum, or frequency-hopping inlays or wireless sensors.

A common cause for RFID tags to not read is for a tag to be located at a null in the carrier field. Nulls typically occur at several points along a beam path between the interrogation antenna and the RFID transponder. Circularly polarized antenna exhibit the problem of vector rotation wherein the propagating electric field from the antenna rotates along a spiral path. If the electric field vector aligns with the transponder's strongest polarization, then the tag will readily read. On the contrary, if the field vectors are misaligned, the tags will not read with high probability.

An operational solution to this problem is to scan again from a different angle, polarization angle, and or distance for reducing location errors.

Referring to FIG. 1, a preferred beam forming solution is to use dual elliptical antenna 10. It is a high gain circularly polarized four-element Quadix antenna, which is an improved antenna that is derived from a much larger, and heavier prior art 146 MHz Ham radio design by Ross Anderson W1HBQ. Antenna 10 has advantages such as minimal weight and minimal wind load due to its small surface area. Wind load force is calculated as one-half of the density of air times the velocity squared times the surface area presented to the wind. Antenna 10 has a reduced surface area, which when computed over the entire structure on all sides is about 150 square inches.

Preferred embodiments of antenna 10 uses 16 AWG half-hard brass wire for the elements. The total weight is about five ounces, and when weighed in grams in any case is less than 200 grams. With respect to a UAV, these are advantages over a high gain patch or panel antennae, a Yagi-Uda, or a conventional helix with the large reflector that it requires.

Figure 5:
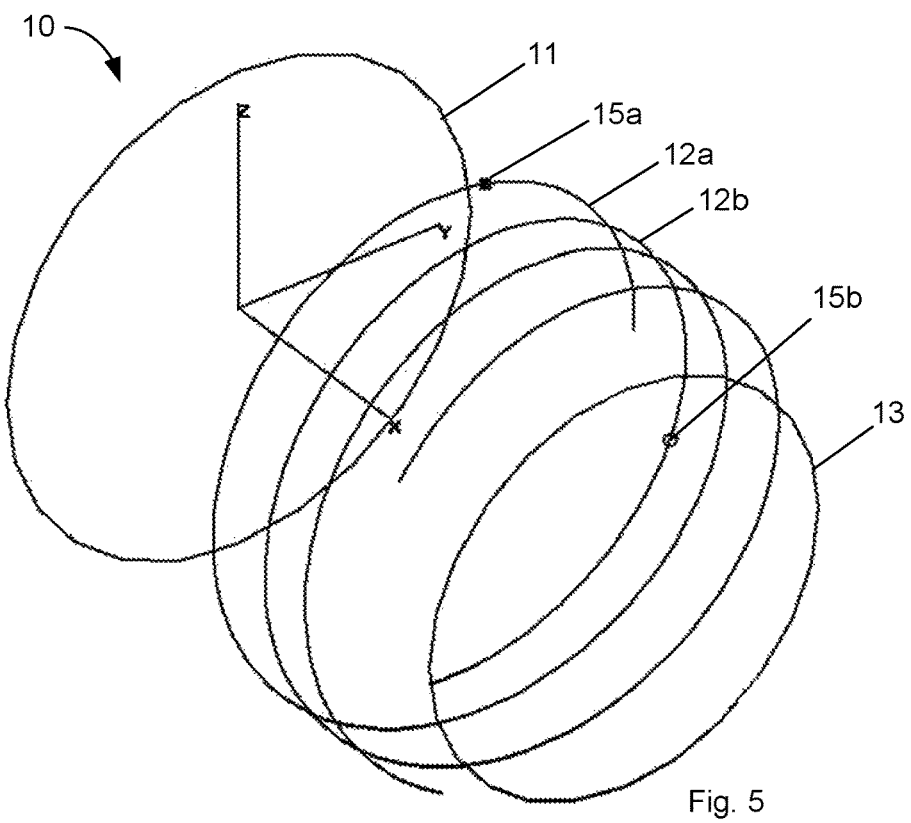
FIG. 5 is an RF model of a directional dual-elliptical UHF RFID antenna according to one embodiment of the present invention.
Figure 6:
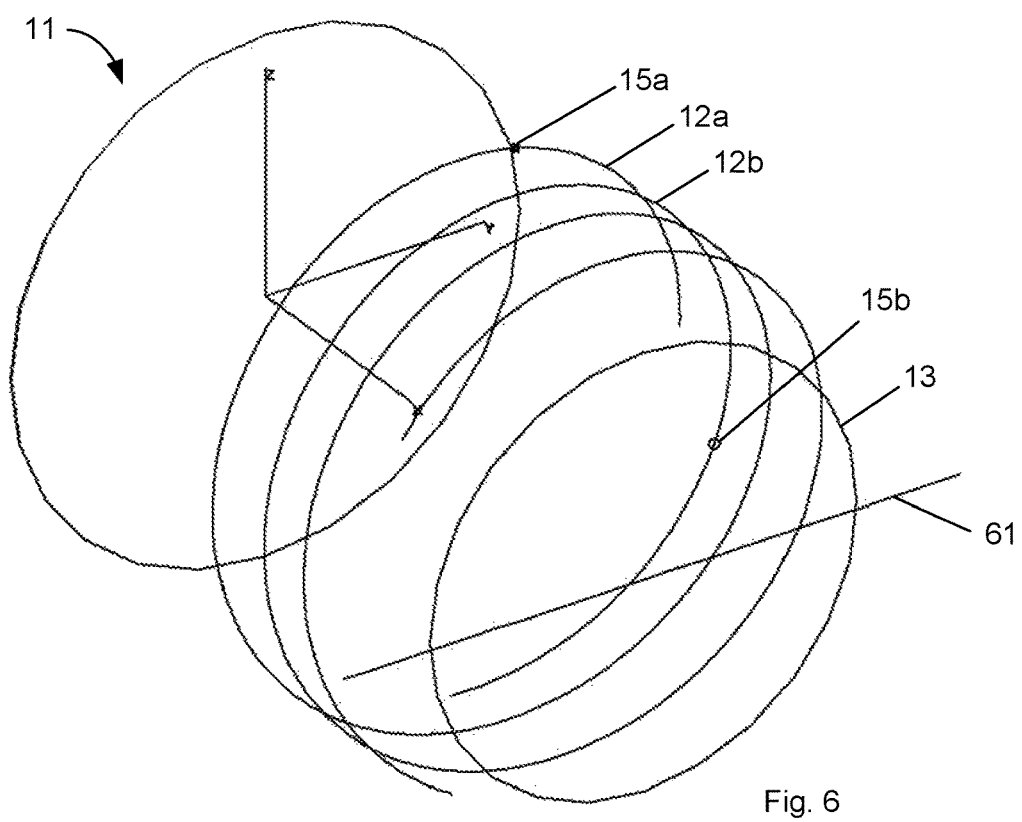
FIG. 6 is an RF model of a directional dual-elliptical UHF RFID antenna having a linear horizontal beam-forming element according to one embodiment of the present invention.

This novel antenna, designed for aerial RFID scanning is also related to a bifilar helical antenna wherein its traditional metal ground plane reflector that is typically used in prior art helical antennae, is replaced by the combination of toroidal reflector loop 11 and one or more director toroidal loops 13. FIG. 5 shows an RF model for that embodiment. In another preferred embodiment a director is formed by a second toroid-shaped loop having a smaller diameter than the reflector loop. In another preferred embodiment, the second director is linear re-radiating element 61, which is a linear horizontal beam-forming element as shown in the RF model of FIG. 6.

Figure 3:
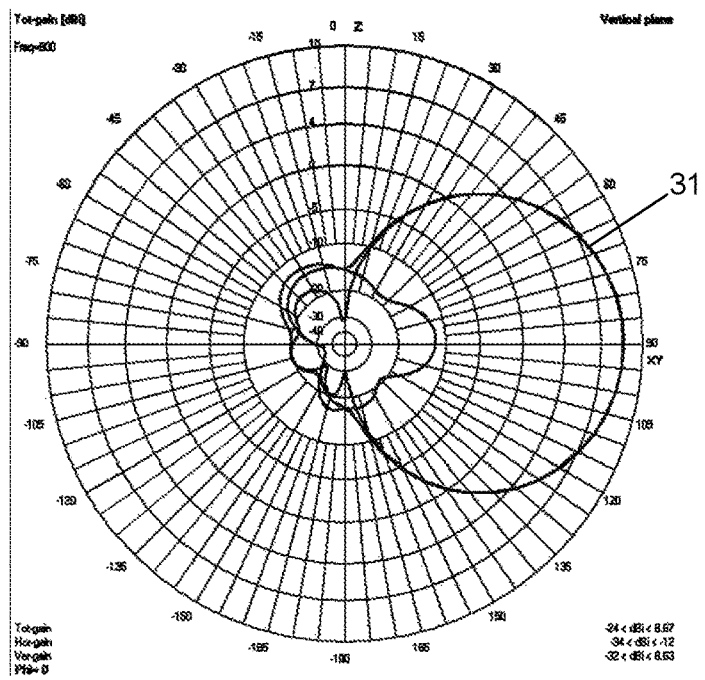
FIG. 3 is a beam pattern of the vertically polarized antenna structure.
Figure 4:
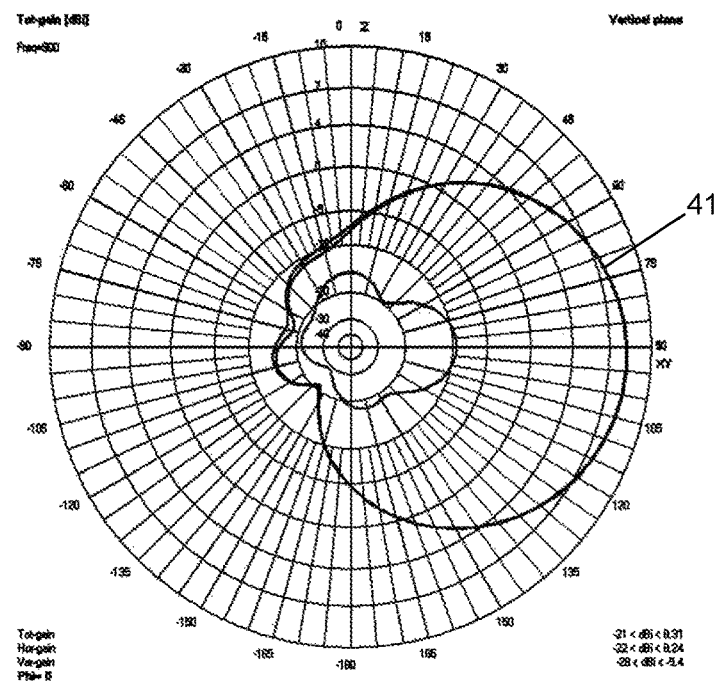
FIG. 4 is a beam pattern of the horizontally polarized antenna structure.

Referring now to FIGS. 3 and 4 the radio frequency beam patterns are shown. FIG. 3 shows beam pattern 31 for the vertical antenna, and FIG. 4 shows beam pattern 41 for the horizontal antenna.

Additional directors may be added to further enhance the beam forming. In a preferred embodiment, two, three, four or more linear metallic director elements are used to reduce the ellipticity of the vertical and/or horizontal polarized wave fronts, thus resulting in more linear wave fronts. Linear wave fronts have the advantage of consistent alignment of tag and antenna polarizations, regardless of distance along the beam path.

The two exciters are fed by two different ports of an RFID interrogator such as the ThingMagic M6e-Micro. In a preferred embodiment, antenna port 1 is connected through coax cable 14a to balun board 15a of vertical exciter 12a, and antenna port 2 is connected through coax cable 14b to balun board 15b of horizontal exciter 12b. The balun is a bi-directional electrical device that converts radio frequency signals from balanced to an unbalanced signal. Preferred embodiments also use an impedance-matching circuit on the unbalanced side of the balun to match the impedance of the balun to a 50 ohm impedance: 50+j0 ohms. Preferred balun boards use a 4:1 balun, which would for example have a 200 ohm impedance on the balanced side and a 50 ohm impedance on the unbalanced side. The balun boards would also preferably have a matching network such as a PI network using capacitors and inductors to precisely match the impedances, including a 50 ohm impedance for the coaxial cable that connects the exciter to one port of the RFID interrogator. The preferred result is a low return loss of lower than −20 dB at selected frequencies within the 860-960 MHz range. In a preferred embodiment, the return loss for each antenna is less than −10 dB across the 902-928 MHz band, and a return loss of −25 dB at 915 Mhz. Also preferably, the horizontal and vertical polarizations preferably at any distance are within 2 dB of each other. In a dual-linear or dual elliptical antenna, the dominant polarizations are compared, specifically the vertical polarization of the vertical antenna compared to the horizontal polarization of the horizontal antenna.

The reflector and exciters have a nominal diameters of 4.6 inches and the director has a nominal diameter of 3.8 inches. The exciter helical spacing is nominally 1.2 inches. Antenna elements, including the exciters, reflector, director(s), and balun boards are retained in place by a structure, preferably comprising plastic, such as acetyl copolymer, also known by the popular trade name Delrin. The plastic structure is preferably attached a to UAV using a mount such as a GoPro mount through an adapter that engages with mounting slot pair 17.

Figure 9:
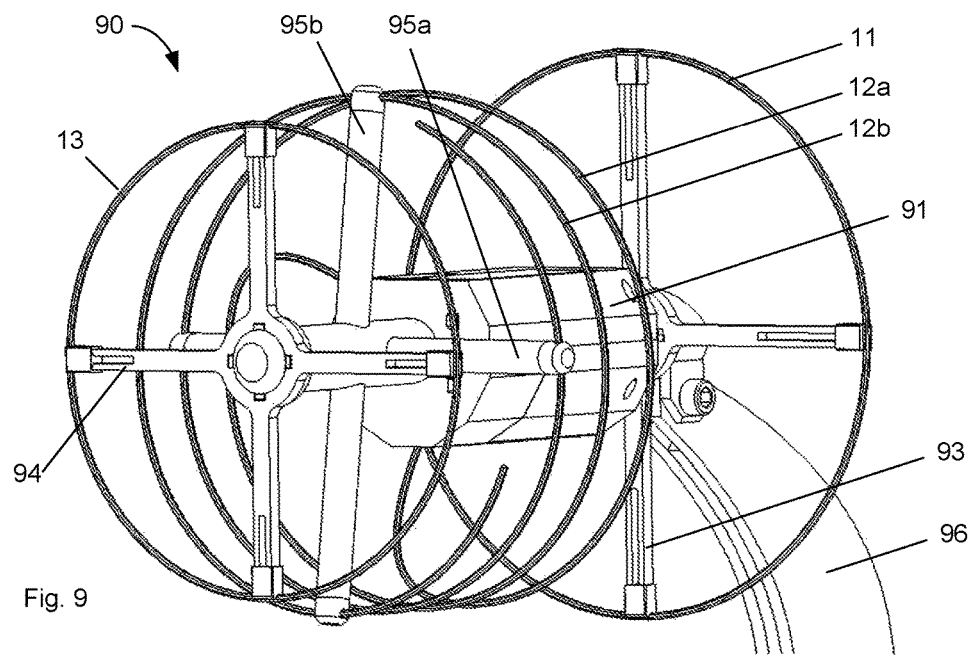
FIG. 9 is a directional dual polarization UHF RFID antenna with end-fed exciters according to one embodiment of the present invention.
Figure 10:
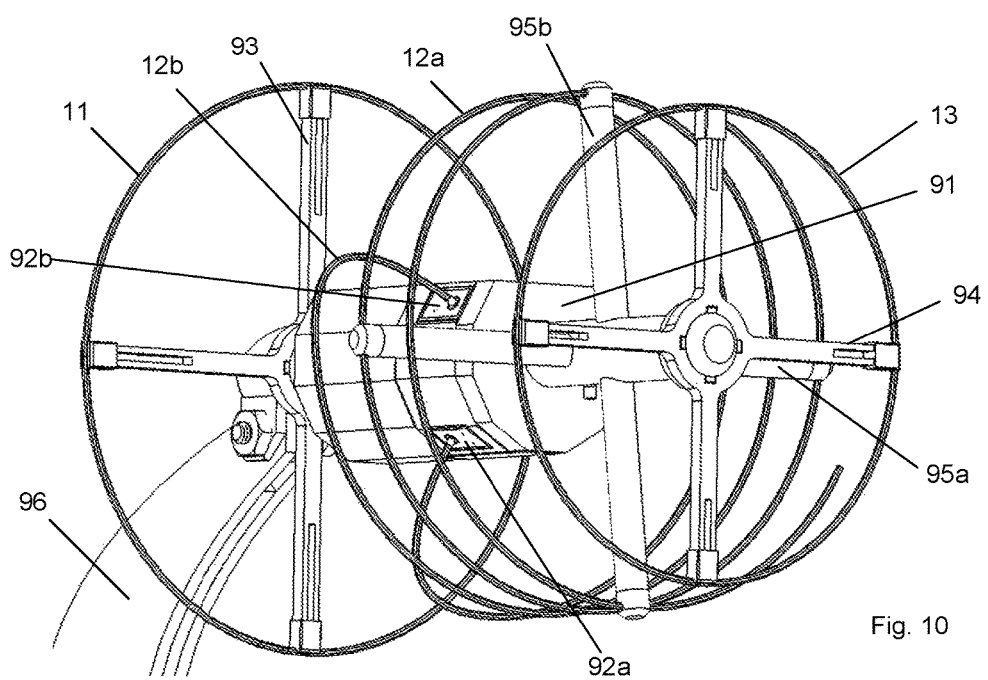
FIG. 10 is a directional dual polarization UHF RFID antenna with end-fed exciters according to one embodiment of the present invention.

Referring now to FIGS. 9 and 10 is antenna 90, a preferred embodiment of a cross-polarized dual-elliptical antenna. Antenna 90 is comprised of toroidal reflector loop 11 having a diameter of about 4.4 inches which is retained by plastic reflector support 93, a first helical exciter element 12a having a diameter of about 4.0 inches with about 1.2 inches between the turns located on above of the reflector loop, a second exciter element 12b having a diameter of about 4.0 inches with about 1.2 inches between the turns located above and rotated ninety degrees to the first helical exciter element, and a toroidal director loop 13 having a diameter of about 3.7 inches which is retained by plastic director support 94 located above the second helical element 12b. The location relationships described above are for an upward-pointing antenna 90 with the resulting beam pattern pointing upward above the antenna. In preferred embodiments the reflector, the two exciters, and the director elements are made of 16 AWG half-hard brass wire; when mechanically deformed, they return to their originally-manufactured shape in antenna 90. The toroidal reflector and directors are preferably formed and then held in a closed loop by soldering or brazing the ends together.

Unlike a Quadix antenna or antenna 10, antenna 90 has helical exciter elements that are end-fed wherein an impedance matching network, preferably comprising a series-connected fixed inductor and a shunt capacitor, both connected to the 150 to 200 ohm proximal end of the helical exciter elements. The two impedance-matching networks are preferably tuned for the best performance from 900 to 930 MHz; they are made using printed circuit boards 92a and 92b for each wherein the 50 ohm unbalanced signal from an active radio circuit is connected through a coaxial cable that is terminated by a coaxial connector, the outer shield of which is preferably terminated to a local metal ground. The local metal grounds from both of the impedance-matching circuits are preferably connected to each other through a conductive metallic skin such as copper foil that is wrapped around a hollow central core 91 of a structural material such as plastic. Therefore antenna 90 has a hollow central core with its proximal end located about 0.8 Inches above the reflector toroid and a having a polygon shape with about a 1.5 inch cross section and a length of about 2 inches wherein the outer skin is conductive and provides a ground plane for the exciters and a Faraday cage for any circuits that are inside of it to reduce RF coupling of them with the electromagnetic fields moving in and around the antenna elements. The resulting relative orientation of the two impedance-matching circuits is 90 degrees to each other, like the 90-degree relationship between the two exciters. Within the hollow cavity of the supporting structure of the central core, there is space provided for radio circuits. In a preferred embodiment, an RFID interrogator such as the ThingMagic M6e-Micro is embedded within the hollow core with a USB cable to provide power and communications extending out from it. The two U.FL RF connectors located at each of its two RF ports are connected to the RF connectors on each of the two impedance-matching circuits that feed the proximal ends of each of the two 90-degree oriented helical exciters. In a preferred embodiment, the RFID interrogator antenna interface circuitry alternates between port 1 and port 2 to drive an encoded carrier wave through antenna 90 to produce an electric field with a certain polarization. Then the RFID interrogator antenna interface circuitry then drives the other port to emit a second encoded carrier wave through antenna 90 to produce an electric field with a polarization that is about 90 degrees from the first wave. As the RFID interrogator stops modulating the outgoing carrier wave and listens to incoming backscatter from remote RFID transponders, it demodulates and decodes the RF signals that return from remote RFID transponders.

Unlike antenna 10, preferred embodiments of antenna 90 do not have baluns for connecting the unbalanced signal from the RFID interrogator to the somewhat more balance exciter elements. By not having a balun antenna 90 does not have insertion loss or return loss that are characteristic of a microwave balun; it also means though that return signal currents flow through the coax shield back to the active RF circuit resulting in the coax cable interfering with the formation of the desired radio beam pattern and preferred s-parameters at the feed points. Therefore the coax cables are preferably less than 2 inches long and located completely with the conductive skin of the hollow core of antenna 90 so that the coax cables do not significantly affect the radio beam pattern or s-parameters.

The first and second helical exciters are formed such that the proximal end of the exciter curls inward to connect with its antenna feed point as shown in FIGS. 9 and 10. The shape of the curl is preferably that of a spline that is tangent to the helical part and perpendicular to the plane of the feed point to which its proximal end terminates, the shape is preferably monotonic.

The conductive skin is preferably made of copper foil and is a good conductor of both electric current and heat. The radio gain stage, such as that in the M6e-Micro produces heat, especially at power levels above 27 dBm. The heat is preferably conducted to the outer skin of the hollow central core. Preferred embodiments use copper ground plane, via arrays, and conductive planes for efficient thermal transfer.

Helical supports 95a and 95b are preferably made of plastic and have minimal contact with exciters 12a and 12b, and preferably only at low voltage points in the E-fields that circulate through the exciters as shown in FIGS. 9 and 10. ANSYS HFSS antenna modeling software will display E-field vectors that are preferably used to determine the locations of these points on the antenna elements. The plastic materials for helical supports 95a and 95b can for example be comprised of ABS, Acrylic, Delrin, Nylon, CPE, or other resins; each different material has characteristic dielectric properties such as dielectric constant and dielectric loss tangent that affect the s-parameters of antenna 90 and the resulting beam pattern. In another embodiment of antenna 90, the coax cables are longer, extending out from the hollow central core, through the center of the reflector loop, and out the back of the antenna. The conductive skin preferably has a shield connected to it that does not carry return signal back to an active external radio circuit.

Antenna 90 preferably has a return loss of about −17 dB, a gain of about 8 dB, and a front-to-back ratio of about 20 dB. Antenna 90 while delivering these performance benchmarks and operating with dual orthogonal electric field propagation results in an RFID reader antenna with no nulls. This is a significant improvement over prior art RFID antennae. Since modern RFID transponders that are used for identifying assets such as as retail items or their containers use simple, low cost antenna structures having a single linear polarization, they must be interrogated by an RFID interrogator and antenna that produce an electric field that has an E-field polarization that is aligned well enough to couple energy into and receive backscatter modulation from the RFID transponders.

Prior art RFID antenna that are currently in popular use produce a circular or elliptical field having an electric field (i.e. E-field) vector that rotates through 360 degrees every few feet along its propagation path to and from remote RFID transponders (i.e. tag). As the E-field vector rotates, there are typically places where an RFID tag is illuminated by an E-field that is oriented about 90 degrees to the linear polarization axis of the RFID tag. In such cases, the RFID tag either receives insufficient energy to power up, or insufficient carrier wave to backscatter to the RFID antenna and its interrogator. In such cases, that RFID tag cannot be interrogated at that distance. However as the distance between the RFID interrogator antenna and the RFID tag change to either a greater or lesser distance, the energy received by the RFID tag is sufficient to power up and backscatter data to the RFID interrogator. This situation that is described above is commonly referred to a null or dead zone. Antenna 90 does not have such nulls or dead zones because there are two polarizations that are concurrently available for reading RFID transponders; meaning that there is a much higher probability that nulls, if observed will typically be observable only at greater distances between the RFID reader and the remote RFID tags. This is a significant improvement over prior art.

Antenna 90 is preferably mounted to a robot or a UAV using plastic structural mount 96. Other preferred embodiments have a second toroidal director located above the first toroidal director for increased gain.

Figure 8:
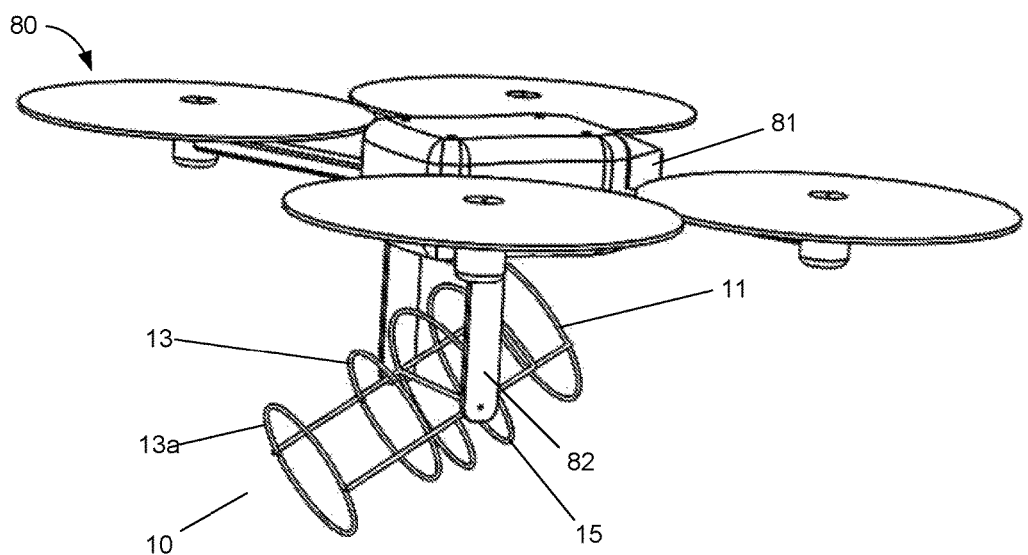
FIG. 8 is an unmanned aerial vehicle (UAV) with an aerial RFID antenna according to one embodiment of the present invention.

Referring now to FIG. 8 unmanned aerial vehicle (UAV) 80 of provides X, Y, Z, rho, theta, phi freedom of aerial mobility. There are several UAV platforms including quadracopters, tri-copters, hexacopters, octocopters, and helicopters, that are adapted to carrying a directional UHF RFID reader 81 and antenna 10 for interrogation of RFID transponders.

Aerial robot 80 is preferably fabricated from molded plastic and machined aluminum fittings for the UAV frame and housing of the autopilot and RFID reader 81. Motors turn propellers (shown as a blur as if in rotation) to provide lift, propulsion and to control pitch, roll, and yaw. Commercially available quadcopters such as the Sky-Hero and multicopters from Align represent aerial platforms that are suitable for constructing aerial robot 80.

Aerial robot 80 is capable of movement in any direction and in preferred embodiments implements a scan pattern comprising vertical movements between vantage points.

The autopilot preferably contains a 3-axis accelerometer, gyroscope, digital compass, barometer, and CPU. Preferred Pixhawk PX4 embodiments use an ST Micro LSM303D MEMS accelerometer/magnetometer. The Pixhawk PX4 autopilot from Pixhawk.org is representative of this type of autopilot. It uses a 168 MHz/252 MIPS Cortex-M4F ARMv7E-M CPU with a floating-point unit. The PX4 also has 14 pulse width modulation (PWM) outputs to servo-control motors and control surfaces, including quad electronic speed control (ESC). In addition to serving navigation and control loop inputs, the accelerometer is preferably used to report the Z-axis angular attitude of aerial robot 80 and through a known offset angle, the vertical angular component of antenna 10 relative to the earth's gravitational field. The attitude of aerial robot 80 is preferably reported to a data collector, preferably using either a serial port (either synchronous or asynchronous) or a universal serial bus (USB).

The data collector is preferably at least comprised of a 32-bit CPU and 512M bytes of RAM that are preferably combined into a single module such as the Broadcom BCM2835 700 MHz ARM1176JZFS. A clock is used to time RFID data acquired from the RFID interrogator and aerial robot 80 attitude reports.

The CPU of the data collector preferably receives an asynchronous stream of RFID tag data from the RFID interrogator that in a preferred embodiment is a ThingMagic M6e-Micro, capable of sending data at a rate of up to 750 tag records per second. Tag read records preferably include Meta data such as RSSI and are preferably recorded in memory, including duplicate tag identification numbers. This is unlike prior art RFID tag readers such as handheld RFID tag readers in that prior art typically use a hash table or similar means to deduplicate tag sightings so that only a single tag sighting is reported, sometimes also with a count of the number of times that it was seen by the reader. In the present invention the CPU uses a time clock to timestamp tag sightings before they are stored in memory. In a preferred embodiment, the CPU and memory are combined within a single device such as the Broadcom BCM2835.

Memory preferably holds records of each tag read and their corresponding timestamp. Estimated flight position and attitude of aerial robot 80 are also recorded with timestamps. Preferred embodiments also run a flight pattern of rows along various headings in order to enhance RFID tag location data sets recorded in memory. Each point where RFID scan data is collected is a vantage point.

Vantage point computations preferably consider the downward angle of antenna 10 relative to the top plane of aerial robot 80 as shown in FIG. 8. Except when hovering in one place, aerial robot 80 also has angular offsets in pitch, roll, and yaw that must be considered. The gain and resulting beam shape of antenna 10 also determines the amount of angular uncertainty for each RFID tag reading.

A vital characteristic of the directional antenna is that it be both very light and have a minimal surface area in order to reduce wind load. Wind load is particularly important with respect to air rushing past the UAV's propellers and applying wind load pressure on the antenna, which increases the load on the UAV. Wind load is also a risk when operating the UAV scanner outdoors or in an area with large fans for air circulation, such as large industrial warehouses. Weight is always a concern for aircraft design; the antenna is a payload for the UAV aircraft to carry. Therefore, less weight is better. The present invention discloses an antenna that uniquely meets these vital characteristics.

GPS signals are preferably used for guiding robots while reading inventory such as cars in outdoor automobile lots.

There are many indoor locations where GPS signal strengths are too low for indoor GPS guidance. This section teaches solutions to that problem by using location references within the volume that is scanned for RFID-tagged inventory items. Unlike GPS, the scan volume may be indoors and/or outdoors.

The instant invention discloses location references that send or receive sonar pulses or send/receive laser light in order to provide location and heading information for robots.

The location references have locations within a constellation map that is communicated to the robot. In a preferred embodiment, the three dimensional location of each location reference are compiled to create a constellation map. The constellation map is preferably communicated to each robot via Wi-Fi. In a preferred embodiment, the constellation map of location references is transmitted using either TCP or UDP packets. Using UDP packet, the constellation maps are broadcast such that each mobile device in the vicinity can use an internal dictionary or database to lookup the location of each location reference by its designator number.

Preferred embodiments of robot 70 or UAV 80 use one or more VL53L0X laser ranging modules from ST. Each has a 940 nm VCSEL emitter (Vertical Cavity Surface-Emitting Laser) for a Time-of-Flight laser ranging module. It measures the distance to objects that reflect light, at ranges of up to 2 meters. Preferred embodiments use these small sensors to sense people and objects in the environment around robot 70 or UAV 80. They offer a key advantage for retail store scanning applications because the VL53LOX will sense fabric items such as saleable retail store apparel that would not be detectable by sonar sensors.

In other preferred embodiments sonar or ultrasonic ranging is used to measure time-of-flight of sound bursts referred to as pings. When a sound transmitter and a receiver are in the same place it is monostatic operation. When the transmitter and receiver are separated it is bistatic operation. When more transmitters (or more receivers) are spatially separated, it is called multistatic operation. The present invention uses all three types, each wherein a sonar transmitter creates a pulse of sound called a "ping", and the sonar receivers listen for the ping. This pulse of sound is created using outputs from electronic circuits. A beamformer is used to concentrate the acoustic power into a beam.

In the present invention, to measure the distance from robot 70 to a node, the time from transmission of a ping to a reception node is measured and converted into a range by knowing the speed of sound. To measure the bearing or attitude, estimates are made using the rotation of robot 70 and from the directional beams from each of the sonar transmitter transducers.

The location of robot 70 is accurately determined using at least four of the sonar receiving nodes that listen for sonar pings from robot 70 ultrasonic transmitter array. The locations of each of the reception nodes is first determined using surveying tools including laser range finders, tape measures, or ultra wideband time-of-flight localization systems. In a preferred embodiment radio transmitters are based on chips such as the Maxim MAX7044 which is a 300 MHz to 450 MHz High-efficiency crystal-based+13 dBm amplitude shift keying (ASK) transmitter having a 250 us oscillator start-up time and 40 nA standby current. The sonar receiving nodes are preferably powered by a long-life battery such as a 3-volt lithium coin cell and all components have very low (i.e. micro-amp level) leakage current and CMOS circuitry, including op-amp TLV2764 with 20 uA per channel supply current and a unity gain of 500 KHz. Sonar receiving nodes preferably remain powered on with their ultrasonic receivers actively waiting for acoustic waves from robot 70, at which time the MAX7044 powers up, its oscillator starts, and the CMOS circuitry serially transmits a selectable identifier to the MAX7044 for modulated data transmission. For a 303 MHz carrier, and while using a 9.84375 MHz crystal, the CLKOUT clock signal is 615.2 KHz, which when divided by 8 provides a 76,900 bits per second data rate.

Other preferred embodiments use Bluetooth Low Energy (BLE) nodes instead of the narrowband radio chips described above. Use of these requires a time-synchronization technique for accurate measurement of time-of-flight readings.

The sensor network is used to for trilateration computations. Note that the time-of-flight between radio waves and acoustic waves differ by six orders of magnitude due to the differences in the speed of light (300,000,000 meters per second) and the speed of sound (344 meters per second). The time-of-flight of the radio waves are well below the sensing threshold of the electronics used in the present invention. Since acoustic energy dissipates over distance according to the square law, the amplitude of the reflected ping wave front is reduced by the distance to the fourth power.

Navigation through an RFID-tagged facility requires that the position and attitude of robot 70 be known. Preferred aerial scanning systems include reference points and signaling methods that relate to the position and attitude of robot 70 relative to those reference points. Types of references and signaling methods use radio waves and or acoustic waves. Types of radio waves include GPS signals, Wi-Fi signals, narrowband, spread spectrum, and ultra wideband (UWB) signals. Preferred embodiments also use micro-machined 3-axis 3D accelerometers, gyroscopes, and barometer, and magnetometers to sense acceleration, angular velocity, and heading and feeding those sensor measurements into computer 16 where control loops and estimator algorithms run. In a preferred embodiment computer 16 is an ODROID-XU4 from Hardkernel Co. Ltd. Of South Korea, having Samsung Exynos5422 Cortex™-A15 2 Ghz and Cortex™-A7 Octa core CPUs. Preferred embodiments include sensors such as ST Micro LSM303D 14-bit accelerometer and magnetometer, ST Micro ST Micro L3GD20H 16-bit gyroscope, Invensense MPU 6000 3-axis accelerometer/gyroscope, and MEAS MS5611 barometer.

Preferred control loops and estimator algorithms are available and adapted for use with robot 70 from open source autopilot developer communities such as PX4 and Paparazzi. Both are open-source autopilot systems oriented toward inexpensive autonomous aircraft. PX4 flight stack module source code is available at https://github.com/PX4/Firmware/tree/master/src/modules.

Another preferred embodiment uses a Qualcomm Technologies Flight Platform based on Linux operating system, a Qualcomm Snapdragon 801 processor and 4K Ultra HD video, computer vision, navigation, and real-time flight assistance. Project Dronecode is porting PX4 to operate in multi-threaded embodiments that will run on symmetric multiprocessing (SMP) Qualcomm Hexagon under a Linux operating system.

In a preferred UWB embodiment a DecaWave ScenSor DWM1000 Module is used for an indoor positioning system. DWM1000 is an IEEE802.15.4-2011 UWB compliant wireless transceiver module based on DecaWave's DW1000 IC. DWM1000 enables the location of objects in real time location systems (RTLS) to a precision of 10 cm indoors.

In a preferred embodiment a combination of narrowband or spread spectrum radio signals within an appropriate frequency band and acoustic waves as taught herein where a radio signal is used to indicated time of arrival of an acoustic ping at a remote sensing location. Time-of-flight of acoustic waves is used to compute distances with raw accuracy on the order of 1 centimeter.

Range measurements from fixed reference points are preferably used in trilateration computations to determine robot 70 position and attitude. A preferred trilateration calculation method uses four points where one point will be the origin (0, 0, 0), one point will lie on the x-axis (p, 0, 0), and one will lie on the xy-plane (q, r, 0). The fourth point will have an arbitrary location (s, t, u). This results in the following equations for x, y, and z where "Sq(p)" for example means p to the power of 2 and SqRt( ) is the square root operation:

$$x=(Sq(d1)-Sq(d2)+Sq(p))/2p$$

$$y=(Sq(d1)-Sq(d3)+Sq(r)+Sq(q)-(q(Sq(d1)-Sq(d2)+Sq(p))/p)/2r$$

$$z=+/-SqRt((Sq(d1)-Sq((Sq(d1)-Sq(d2)+Sq(p))/2p))-Sq((Sq(d1)-Sq(d3)+Sq(r)+Sq(q)-(q(Sq(d1)-Sq(d2)+Sq(p))/q)/2r))$$

Using a nominal conversion factor of 147 us per inch, the distance covered by a wave front traveling at the speed of sound is 50 ms/147 us, which equals 340 inches or 28.34 feet.

Other preferred embodiments of the present invention include cameras for photography, retail store surveillance, and for reading barcodes. Barcode decoding algorithms including open source algorithms. In a preferred embodiment a Samsung 5Mpixel K5ECG MIPI CSI sensor is used for capturing still images or videos.

In a preferred embodiment, robot 70 have an API for shoppers to take control of BIS 10 or 80 for amusement and for shoppers taking photos of themselves and their friends inside or outside of the retail store (i.e. "selfies"). In that embodiment retail stores benefit from attracting customers and making it fun for shoppers to use this in conjunction with social media to show their friends the clothes, footwear, or handbag that they are interested in at that retail store, thus attracting additional business from the shoppers' friends.

In a preferred embodiment LIDAR sensors, such as LIDAR-Lite from PulsedLight, Inc. of Bend, Oreg. (now owned by Garmin International) are used for determining the range to surrounding objects, people, or fixtures. Precise angle measurement can also be obtained while monitoring outputs from the Lidar-Lite 3 as Laser Rangefinder it is rotated around an axis, observing reported ranges. As the laser spot passes over a section of reflective tape with corner cube reflectors embedded in it, a range discontinuity is reported; this is because the corner cube surface reflects nearly all of the photons from the Lidar back to the Lidar, into the its optical light receiver, overwhelming it with excessive signal. Preferred arrangements of Lidar-Lite rotation angles and placement of sections of reflective tape provide a enable measurement of both distance and angle of the environment surrounding it.

In other preferred embodiments RADAR is used to scan the area surrounding BIS 10 using GHz range scanning technology that is adapted for UAV use from companies that include Silicon Radar GmbH of Frankfurt, Germany. The 122 GHz FMCW frontend contains a 122 GHz SiGe transceiver chip fabricated in IHP SG13S SiGe BiCMOS technology, transmit and receive antenna (LCP substrate)—bonded in a standard pre-mold open cavity QFN package covered by a special lid. The IC is an integrated transceiver circuit for the 122 GHz ISM-band with antennas. It includes a low-noise-amplifier (LNA), quadrature mixers, poly-phase filter, Voltage Controlled Oscillator with digital band switching, divide by 32 circuit and power detector.

Preferred embodiments include simultaneous localization and mapping (SLAM) functions for constructing or updating a map of an unknown environment while simultaneously keeping track of the location of robot 70 within the map. Preferred embodiments use a particle filter or an extended Kalman filter.

In a preferred embodiment, use a Lidar that emits laser light, preferably in the 600 to 1000 nm wavelength range. A laser diode is focused through a lens apparatus and directed using microelectromechanical systems (MEMS) mirrors for example. Preferred laser beam scan patterns include general forward-looking patterns, sweeping the area in front of the UAV, or patterns that sweep through broader angles including a full 360-degree field of view. Raster scan patterns sweep through yaw and azimuth angles. A Lidar receives and analyzes the reflections off of objects that surround robot 70. Return light is amplified and processed to create a map or to determine the position of robot 70 within an existing map for navigation.

In preferred embodiments for retail stores having overhead lighting, including fluorescent or incandescent lighting emit sufficient energy in the form of light, electrostatic fields, or heat that can be harvested to power an optical location reference.

Solar cells such as monolithic photovoltaic strings CPC1824 or monocrystalline KXOB22_01X8F, both manufactured by IXYS, are examples of preferred solar cells that convert photons from indoor fluorescent lighting into electric current. These energy harvesting devices power preferred embodiments of location references the present invention.

Figure 2:
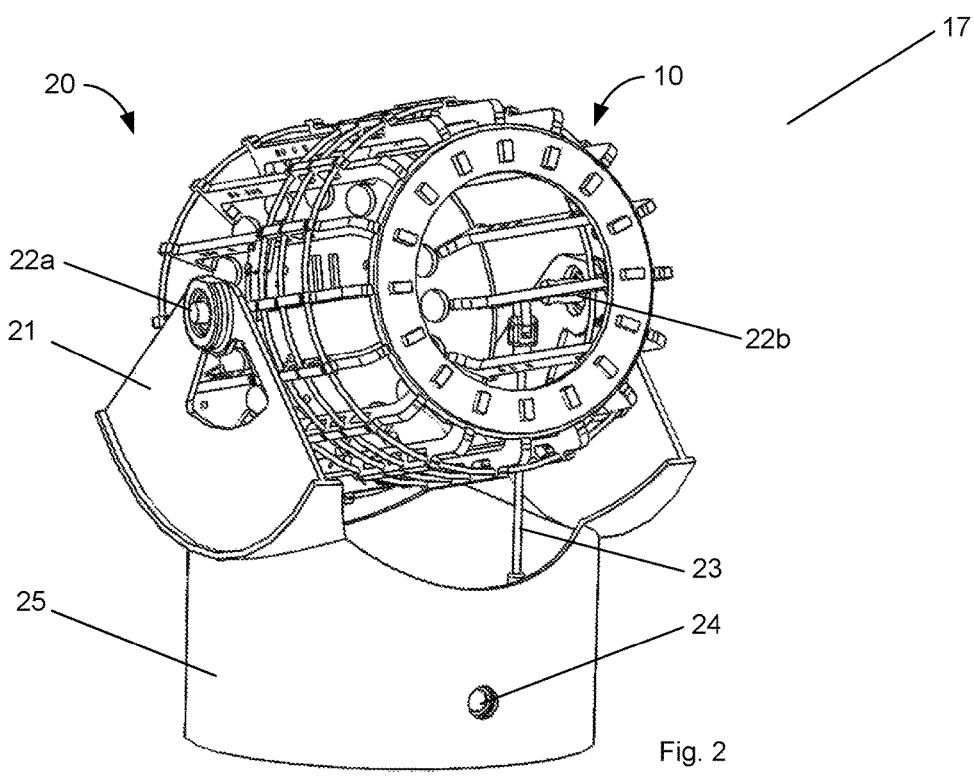
FIG. 2 is a directional UHF RFID antenna with pitch and yaw axis directional mobility according to one embodiment of the present invention.

Using a shaft encoder, robot 70 measures the angle of the direction in which it is transmitting a laser beam from laser 24 of FIG. 2 relative to the body of the robot. Laser 24 rotates as antenna housing 25 rotates through yaw angles, scanning the area around it.

In a preferred embodiment, robot 70 rotates a laser line from a laser 24 such as a 980 nm 60 mW laser line module from Lilly Electronics. The line is oriented in a vertical direction such that it is swept by the rotation of housing 25 of FIG. 2 around in a circle that surrounds robot 70. The controller of robot 70, such as an Intel Compute Stick notes when the laser line passes a reference point and at what angular velocity. Surrounding detectors having a pair of photodiodes such as BPW 34 FASR from OSRAM with an integrated daylight optical filter and that are especially sensitive to wavelengths of light in the range of 730 to 1100 nm. When the 980 nm laser strikes and briefly illuminates the first photodiode, the signal is amplified by a transimpedance amplifier using a low power op amp. The photodiodes are preferably fed into a difference amplifier so that common mode noise will cancel. Optical noise from sunlight and fluorescent lighting is therefore subtracted and eliminated from the output signal to a processor such as a Bluetooth Low Energy (BLE) module. In a preferred embodiment a Microchip BM70 is used to time the pulse arrival times and report them to robot 70 over a Bluetooth link. A timer in the BM70 processor measures the time of arrival of the pulse. Then too when the laser strikes the second photodiode, which is in a preferred embodiment located only 2 inches to the side of the first photodiode, the time of that pulse is also measured and recorded. By comparing the times of the strikes to the reference time and angular velocity that are known by robot 70, the angles are computed for the laser path from robot 70 to each of the two photodiodes. From those two angles and the triangles formed by them along with forward and lateral reference lines, the location of robot 70 is estimated. Accuracy is dependent on the accuracy of each measurement. Preferred embodiments use several such BLE/photodiode modules to report laser strike observations such that robot 70 combines the aggregate of the location estimates to improve the accuracy of the fused triangulation estimate.

Triangulation computations for computing the location of a transponder uses a base line reference. The location of the transponder is computed using the law of sines. Then using the known locations of robot 70 along with its various antenna positions is preferably converted into a store-level coordinate system such as Cartesian coordinates with an x,y,z ordered triplet of axes to record the location of transponders. If the tag is a location transponder that marks location coordinates, then the location of robot 70 is back-calculated and updated. Robot 70 preferably uses accelerometers, gyros, and shaft encoders on wheels 71a and 71b to sense motion, acceleration, posture, and dead reckoning movement to estimate the position of robot 70 between location tag readings and location references.

Cameras are also preferably used with tracking the centroid of optical references, optical flow, and vanishing point navigation to recognize and guide a path for robots through aisles. Optical flow is the pattern of apparent motion of objects, surfaces, and edges in a retail store caused by the motion of the camera. Vanishing point navigation uses the parallel lines of store aisle, shelves, windows, and overhead lighting rails to compute a distant target, such as the end of an aisle; it also provides visual angular alignment for squaring the robot for accurate triangulations and transponder location measurements.

Beams and optical patterns of various types are dispersed through the surrounding space in order to provide an optical point of reference. In some embodiments dispersion is achieved using motion, moving mirrors, and/or other optical elements. In other embodiments, dispersion is achieved using fixed optical elements.

Two-wheeled robot 70 uses a variable pitch RFID scanning antenna such as scan head 20 to direct an RFID interrogation field to selected vectors. Pitch axis 22a and 22b are supported by antenna support structure 21. Push rod 23 is preferably driven by a wing servo, causing antenna 10 to pivot to various controlled pitch angles. A small gear motor that rotates housing 25 controls the yaw angles for antenna 10 and laser 24 for triangulation measurements in support of robot localization.

Scan head 20 has a battery or super capacitor to store energy that is used to drive the RFID interrogator, a data collector, a pitch axis motor, and a yaw axis motor. Preferred embodiments of the data collector use an Intel Edison that provides an ARM processor, a small form factor with Bluetooth, Wi-Fi, and adequate memory to store RFID records.

Scissor lift members 74 are preferably strong, light, and able to conduct electric current to scan head 20 for recharging the battery or super capacitor. Preferred embodiments of scissor lift members 74 use materials such as carbon fiber rods or long thin printed circuit (PC) boards made from FR4 fiberglass. PC boards with dimensions of approximately 0.25"×21.5" preferably use conductive traces to conduct charging current to scan head 20. Members 74 each have three pivot holes with metal plating; one hole at each end of each PC board and one hole in the middle to form the scissor lift structure. Preferred embodiments use wires such as half-hard 16 AWG brass wire soldered between the PC boards to form intersecting triangles for structural strength.

Four lift bars 73 are preferably driven by two gear motors that rotate from a nominally horizontal angle to an elevated angle of approximately 70 degrees. Scissor lift members 74 are attached through pivots to lift bars 73 and expand vertically and collapse in response to movement of the lift bar motors. Significant heights of scan head 20 are realized by adding more lift members 74.

The RFID reads from various vantage points and selected vectors as an aggregate prevent missing any transponders from among a plurality of transponders that prior art readers would miss by either lack of illumination or blinding reflections from the interrogation field. Preferred embodiments use narrow RF interrogation beams, formed by high gain antennae that greatly reduce the magnitude of reflections from off-axis signal vectors that prior art solutions typically receive and process from a plurality of responsive transponders, resulting in ambiguity of the transponders' actual locations; an ambiguity that greatly confounds tag location efforts.

Figure 7:
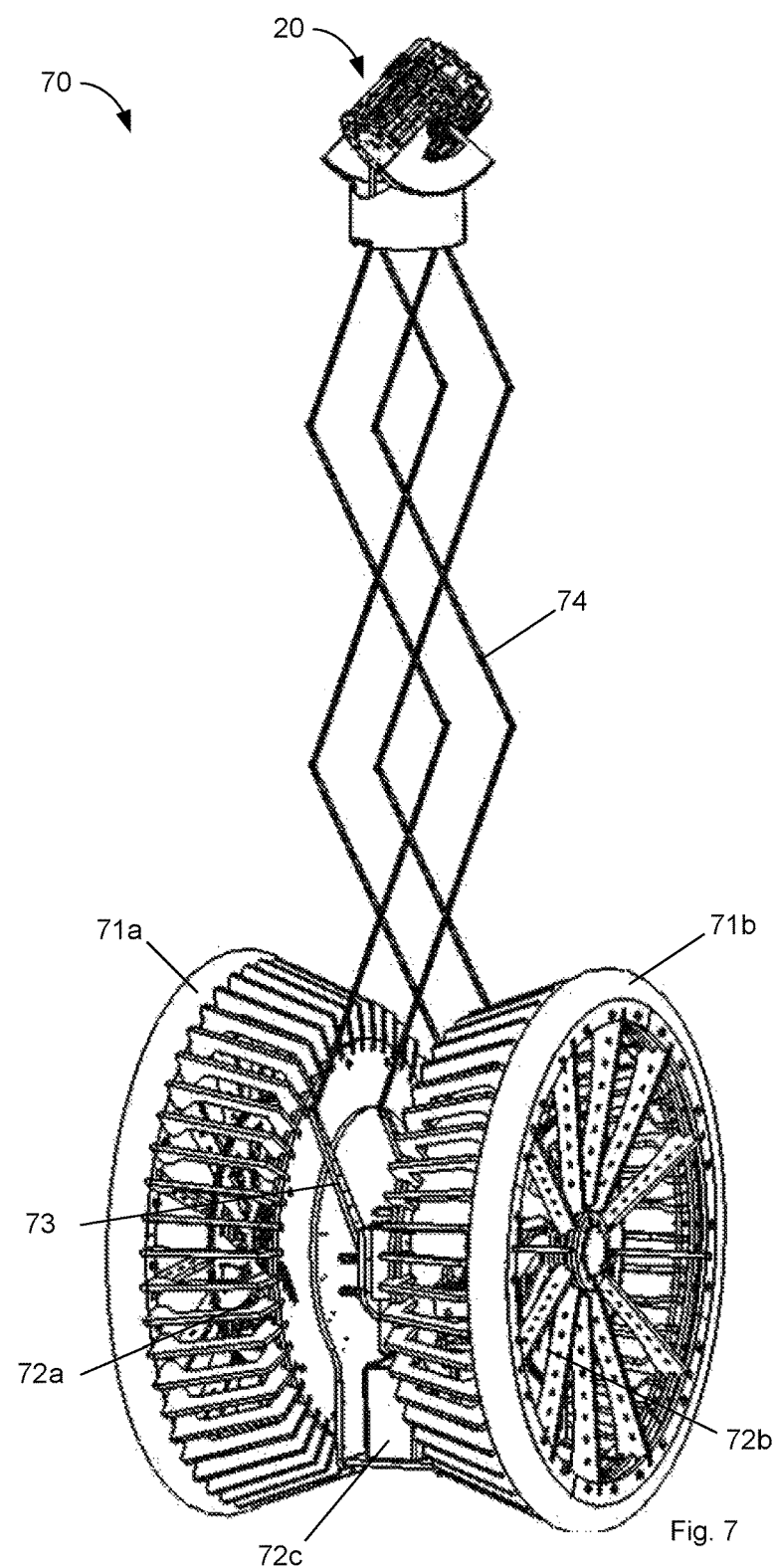
FIG. 7 is a two-wheeled robot with a scissor lift for aerial positioning of a directional UHF RFID antenna according to one embodiment of the present invention.

Robot 70 reads the identity and actual locations of RFID-tagged merchandise. Robot 70 as shown in FIG. 7 determines the locations of tagged goods in retail stores. In this preferred embodiment, there are two wheels 71a and 71b that independently rotate in either a clockwise or counter-clockwise direction to create forward or reverse motions of robot 70 or in opposing directions for a route turn or rotation of robot 70 about a fixed point on the floor.

Battery 72c is mounted below axles of wheels 71a and 71b to provide a low center of gravity; the result is inherent stability, unlike that of a classic inverted pendulum robot or a Segway human transporter.

As robot 70 traverses a retail sales floor or inventory storage areas, it may from time to time encounter obstacles in an otherwise flat surface. Robot 70 is preferably comprised of accelerometers and a three-axis gyroscope that detects changes in position and angular orientation. A robot controller such as a tablet, iPad, ODROID XU4, or Intel Compute Stick preferably detects and responds to changes in orientation under the control of algorithms that take into account the duration of the disturbance and historically related information. Controller 70 preferably learns by recording previous encounters with obstacles at certain locations, and reuses successful maneuvers to escape from known obstacles.

Robot 70 is preferably comprised of proximity sensors such as sonar modules to detect obstacles and boundaries. Sonar modules preferably report range to objects that reflect acoustic waves and enable robot 70 to stop or to take evasive action. Escape maneuvers of robot 70 preferably include reversing, pivoting, and changing direction to go around obstacles such as walls, furniture, and movable objects.

The controller preferably communicates with an RFID reader located within housing 25 using a wired or wireless connection. Information from the RFID reader is preferably collected and stored. In a preferred embodiment, SGTINs are associated with location information. In some embodiments, location is information is augmented by reading fixed location RFID transponders that are encoded with location codes.

Transponder location information preferably references a system or references points that extend beyond the boundaries of the room or space in which robot 70 is operating. A plurality of transponders can therefore have a distance between them that is greater than the physical dimensions of the space that they are contained within. For example, in a preferred embodiment, RFID location transponders are encoded with high-resolution longitude and latitude information. A preferred location identifier for an RFID transponder uses GPS coordinates. Such a location system is preferably used to track the locations of goods on a global scale.

A database preferably collects transponder identities and locations from robot 70 and others like it in facilities around the world. The robots periodically upload data to the database as Wi-Fi, 3G, or 4G wireless services are available.

The database preferably comprises means to report the locations of associated transponders to consumer devices wherein the associations are defined by characteristics of the objects that the transponders are attached to. The associations preferably comprise characteristics that include and are defined by fashion, style, or personal preferences. The database preferably accounts for fashion and style changes and alters the associations so that consumers will be more likely result to buy.

In this and other embodiments the narrow beam improves transponder location accuracy by reducing off-axis reads and reflections that confound tag location efforts. When an aggregate number of such reads are processed using triangulation, then the resulting tag location accuracy is greatly improved over prior art systems, methods, and devices.

In preferred embodiments motors for wheels 71a and 71b are polyphase brushless DC (BLDC) motors such as three-phase BLDC motors with Hall effect sensors or back EMF sensing to sense the angular velocity and position of the rotor. Exemplary motors are 100 to 500 watt hub motor measuring about 5 to 9 inches in diameter that benefit from mass production for e-bikes that have become globally popular, whereby driving costs down. Preferred embodiments of robot 70 use motors that have sufficient torque and traction to climb ramps and stairs in order to successfully scan all parts of multi-level environments. Due to the lack of brushes, BLDC motors will not spark, making them better suited for use in environments where there are volatile chemicals or fuels.

Micro-stepping of BLDC motors using sine-cosine phasing is used in preferred embodiments. Micro-stepping motor drives preferably include a torque feedback loop that controls the current through an H-bridge on each phase using phase current modulation such as pulse width modulation (PWM) to switch phase current on and off in a controlled manner, allowing freewheel current to circulate through a freewheeling diode for each phase as the magnetic flux gradually subsides in a current waveform that resembles a saw tooth. Preferred embodiments use coreless motors with Litz wire coil windings to reduce eddy current losses and wheel weight. Current and therefore torque delivered to motors is preferably controlled by a proportional-integral-derivative (PID) control loop.

Wheels 71a and 71b preferably have spokes to a rim for holding a tire such as a Bell Solid Tube NoMorFlat tire for bicycles. The spokes preferably provide an axle height above the floor that enables sufficient clearance for counterbalancing mass and weight to be placed below the axle whereby moving the center of gravity for the entire robot 70 below the axles. In preferred robot embodiments batteries 72a-c comprise a significant part of that counterbalancing mass and weight. Lead acid, LiNiMnCo, LiFePO4, lithium phosphate, or lithium-ion batteries deliver 20-50 amps to wheel motors in preferred embodiments of batteries 72a-c.

Preferred embodiments of robot 70 include self-aligning recharge connections for parking robot 70 in a location where it can guide itself to recharge batteries 72a-c. In preferred embodiments, batteries 72a and 72b are moved fore or aft to shift the center of gravity of robot 70, maintain balance and an upright position.

In preferred embodiments, high gain antenna 20 rotates to generate multiple beam path vectors that result in multiple read occurrences for triangulation computations to reliably determine the location of each detected transponder. Preferred embodiments use a shaft encoder to measure the angle of antenna housing 25 relative to a body of robot 70.

Referring to robot 70 of FIG. 7, antenna 10 is free to rotate about its yaw axis to provide the item level inventory count and location accuracy that is demanded by retailers and needed for multi-channel shopping. The antenna must be swept in a methodical and controlled manner for triangulation computation as described above.

The above calculations are based on the use of narrow beam, high gain, directional antenna 10 directed along selected vectors in order for the triangulation computations to be valid and accurate. In preferred embodiments, the antenna gain has a minimum of 8 dBic in order to form a narrow interrogation field from an RFID interrogator coupled with the antenna, for reading tags in a narrow sector of RFID-tagged inventory items at any one time. This narrowly focused beam reduces the probability that a scan will be blinded by un-modulated carrier being reflected into the receiver or for off-axis transponders to confound location by being illuminated and responsive to the carrier beam. Preferred embodiments detect amplifier saturation from blinding reflections and record the beam vector and location of blinding carrier reflections. Avoidance of or saving points of location reference are preferred uses of that stored information, enabling multi-dimensional alignment of scans from day to day.

Inventory rounds are preferably swept across the tag from multiple angles, preferably using a high gain antenna in order to reduce the magnitude of location error.

Intermediate transponder location data preferably comprises transponder observations that are used for triangulation computations. Scan results are preferably reported in stages, the second stage comprising: SGTIN; observation point (i.e. location of robot x,y,z); viewing angle (elevation and azimuth); and RF power level (db). Each stage is stored and processed to produce a computation of each tag's location using a descriptor comprising: SGTIN; and computed X, Y, Z Cartesian location. The processing comprises the steps of:

1) Match all first stage SGTIN observations and consolidate the detection records
2) Match any second stage observations to the consolidated first stage records
3) Combine the first and second stage records by formulating the three dimensional vector for both stages and compute the Cartesian point of intersection.
4) Match the result to any previous result of computed X, Y, Z location in a third stage. If there are no matches, then store as final stage transponder location data.

While the invention has been particularly shown and described with reference to certain embodiments, it will be understood by those skilled in the art that various changes in form and detail may be made without departing from the spirit and scope of the invention.

I claim:

1. A dual polarization antenna for scanning RFID transponders comprising:
    a hollow central core having a polygon shape with about a 1.5 inch cross section and a length of about 2 inches wherein the outer skin is electrically conductive;
    an RFID interrogator wherein the interrogator is located within the hollow central core with a first and a second antenna feed point extending through the surface of the skin;
    a toroidal reflector loop having a diameter of about 4.4 inches;
    a first helical exciter element having a diameter of about 4.0 inches with about 1.2 inches between the turns and located above the reflector loop wherein the proximal end of the exciter curls inward to connect with the first antenna feed point;
    a second helical exciter element having a diameter of about 4.0 inches with about 1.2 inches between the turns and located above the first helical exciter element wherein the proximal end of the exciter curls inward to connect with the second one of the antenna feed point;
    a toroidal director loop having a diameter of about 3.7 inches wherein the director loop is located above the second helical exciter element.

2. The antenna of claim 1 further comprising a second toroidal director located above the first toroidal director.

3. The antenna of claim 1, wherein the reflector, exciters, and director elements are made of 16 AWG brass wire.

4. The antenna of claim 1, wherein the reflector, exciters, and director elements are made of half hard brass wire.

5. The antenna of claim 1, wherein the proximal ends of the exciters are fed by an impedance-matching network.

6. The antenna of claim 1, wherein the exciters are mechanically supported at low voltage points.

7. The antenna of claim 1, wherein the outer skin is thermally conductive.

* * * * *